(12) United States Patent
Souparis

(10) Patent No.: US 8,246,081 B2
(45) Date of Patent: Aug. 21, 2012

(54) SECURITY MARKING SYSTEM

(75) Inventor: Hugues Souparis, Nogent-sur-Marne (FR)

(73) Assignee: Hologram Industries, Bussy-Saint Georges (FR)

( * ) Notice: Subject to any disclaimer, the term of this patent is extended or adjusted under 35 U.S.C. 154(b) by 884 days.

(21) Appl. No.: 12/088,635

(22) PCT Filed: Sep. 5, 2006

(86) PCT No.: PCT/FR2006/002040
§ 371 (c)(1),
(2), (4) Date: May 23, 2008

(87) PCT Pub. No.: WO2007/036617
PCT Pub. Date: Apr. 5, 2007

(65) Prior Publication Data
US 2008/0252067 A1    Oct. 16, 2008

(30) Foreign Application Priority Data

Sep. 29, 2005  (FR) .................................... 05 09940

(51) Int. Cl.
*B42D 15/00* (2006.01)
*B32B 9/00* (2006.01)
*B32B 33/00* (2006.01)

(52) U.S. Cl. ......... 283/106; 283/109; 283/86; 428/41.8; 428/42.3; 428/42.2

(58) Field of Classification Search .................... 283/86, 283/94, 106, 109; 428/41.8, 42.2, 43.2, 124, 428/42.3; 156/65, 216, 230, 233, 238–240, 156/300

See application file for complete search history.

(56) References Cited

U.S. PATENT DOCUMENTS

| 4,159,586 | A | * | 7/1979 | Blum | 283/109 |
| 4,951,970 | A | * | 8/1990 | Burt | 428/42.1 |
| 5,058,926 | A | * | 10/1991 | Drower | 283/109 |
| 5,259,906 | A | | 11/1993 | Poplawski et al. | |
| 5,435,600 | A | * | 7/1995 | Griffiths et al. | 283/106 |
| 6,019,395 | A | * | 2/2000 | Souparis | 283/86 |
| 6,305,717 | B1 | * | 10/2001 | Chess | 283/109 |
| 6,747,768 | B1 | * | 6/2004 | Knocke et al. | 283/86 |
| 2002/0086127 | A1 | * | 7/2002 | Hodsdon et al. | 428/43.2 |
| 2004/0091658 | A1 | | 5/2004 | Ginkel et al. | |
| 2004/0091659 | A1 | * | 5/2004 | Banks et al. | 428/41.8 |
| 2005/0089663 | A1 | | 4/2005 | Wong et al. | |

FOREIGN PATENT DOCUMENTS

| GB | 2 254 045 A | 9/1992 |
| WO | 2004/008240 A | 1/2004 |
| WO | 2005/027078 A | 3/2005 |

* cited by examiner

*Primary Examiner* — Edward Tolan
*Assistant Examiner* — Kyle Grabowski
(74) *Attorney, Agent, or Firm* — Arent Fox LLP

(57) ABSTRACT

A security marking system for producing a secure marking label includes a support sheet, such as a silicon-containing sheet, having two separate flaps on a first folding line, the first flap supporting, on the recto side, a first holographic component whereof the surface contacting the support sheet is coated with an adhesive film. The second flap supports, on the same recto side, a second component formed by a film whereof the surface contacting the support sheet is coated with an adhesive film and the opposite surface bears personalizing indicia. The first flap includes a second folding line that is substantially parallel to the first folding line.

9 Claims, 2 Drawing Sheets

SECURITY MARKING SYSTEM

CROSS-REFERENCE TO RELATED APPLICATION

This application is a National Stage entry of International Application No. PCT/FR2006/002040, filed Sep. 5, 2006, the entire specification claims and drawings of which are incorporated herewith by reference.

BACKGROUND OF THE INVENTION

1. Field of the Invention

The present invention relates to a security marking system for the production of a secure label and more particularly, such a system comprising a support sheet such as a silicon-containing sheet having two separate flaps on a first folding line, the first flap supporting on the recto side a first holographic component, whereof the surface contacting the support sheet is coated with an adhesive film.

2. Description of Related Art

Labels composed of two stacked components having different dimensions, sealing therebetween customised information, are already known, where the first component (the bigger one) is a metallized holographic component which can be destroyed in case of a tentative tearing. The second component (the smaller one) is a transparent component which can also be destroyed and which supports the marking allowing the customisation of the label.

More particularly, document FR-A-2757984 discloses a security marking system for the production of a secure marking label comprising a support sheet such as a silicon-containing sheet having two separate flaps with a first folding line. The first flap supports on the recto side the first holographic component whereof the surface contacting the support sheet is coated with an adhesive layer and the second flap supports on its verso face a second component formed by a film whereof the face contacting the support sheet is coated with an adhesive layer and the opposite face bears personalising indicia. A cut in the support sheet makes it possible to stick the first element on the second element so as to seal the signalling marking.

Although such system is generally satisfactory, it also has a certain number of disadvantages.

First, the two components are not on the same face of the support sheet. Therefore, problems exist in the positioning of such components on the sheet. More particularly, one problem resides in the spotting of a label from one face with respect to the other one. Besides, it is necessary to cut the window in the support sheet.

Besides, the production process is rather complex. The cost of production of such labels is therefore rather high.

Finally, the usability of such system is not optimum since both components cannot be seen simultaneously.

BRIEF SUMMARY OF THE INVENTION

The present invention aims at remedying such disadvantages.

More particularly, the object of the invention is to provide a security marking system with two components, wherein both components are of the same nature and are supported by the same face of the support sheet.

For this purpose, the main object of the invention is first a security marking system for producing a secure marking label comprising a support sheet such as a silicon-containing sheet having two separate layered flaps on a first folding line, the first flap supporting on the recto side a first holographic component whereof the face contacting the support sheet is coated with an adhesive layer, and wherein:

the second flap supports on the same recto side a second component formed by a film whereof the face contacting the support sheet is coated with an adhesive layer and the other face bears personalising indicia, the first flap includes a second folding line substantially parallel to the first folding line.

It will be explained hereinafter that both folding lines allow a folding in zigzag of the support sheet, so that the first component can be transferred onto the second component although both components are positioned on the same face of the support sheet.

In a particular embodiment, said first holographic component is at least partially metallized.

In a particular embodiment too, the second flap includes the second holographic component.

Again in a particular embodiment, said second holographic component is at least partially metallized.

In a particular embodiment too, the first component has greater dimensions than those of the second component.

The object of this invention is also a method for producing a security marking system such as described hereabove wherein both components are obtained by processing the same film.

In a particular implementation, the treatment of at least a part of said film intended to form at least one of said components includes the following steps:

stamping a thermosetting layer to form a holographic surface;

metallizing at least a part of said holographic surface; and coating the stamped and metallised surface with an adhesive layer.

More particularly, this method can further comprise a step of partially demetallizing said metallized part.

Each of these steps is known per se, in the field of security marking systems. However, in the method according to the invention, both components remain in the same relative position during the steps and undergo the same processing steps on the same face of the film, simultaneously. Both components are thus obtained by global handlings from the same holographic film. The production of the marking system is thus simplified accordingly.

Besides, the demetallizing of one component makes it substantially transparent. It is thus possible to have information become visible, which can be read from one side or the other side when the security label is then stuck on the transparent surface such as a car windscreen.

The above steps are followed in a known way by the cutting and shaving of the film stuck on a support of the silicon paper type or any other type.

The invention also aims at a security marking method implementing a secure marking label made from a security marking system such as described hereabove.

In a particular implementation method, such method includes the steps consisting in partially unsticking the first component from the support sheet, at least between the two folding lines, in folding the support sheet in zigzag, in sticking on the second component the unstuck part of the first component, in completing the unsticking of the first component from the support sheet, in completing the sticking of the first component on the second component and in withdrawing the support sheet, so as to obtain said secure marking label and in sticking said label on an object needing a secure marking.

Another object of the invention is also an object marked with a secure system using a method as described hereabove.

BRIEF DESCRIPTION OF ThE DRAWINGS

A particular embodiment of the invention will now be described as a non-limitative example while referring to the appended schematic drawings wherein.

DETAILED DESCRIPTION OF ThE INVENTION

Figure 1:
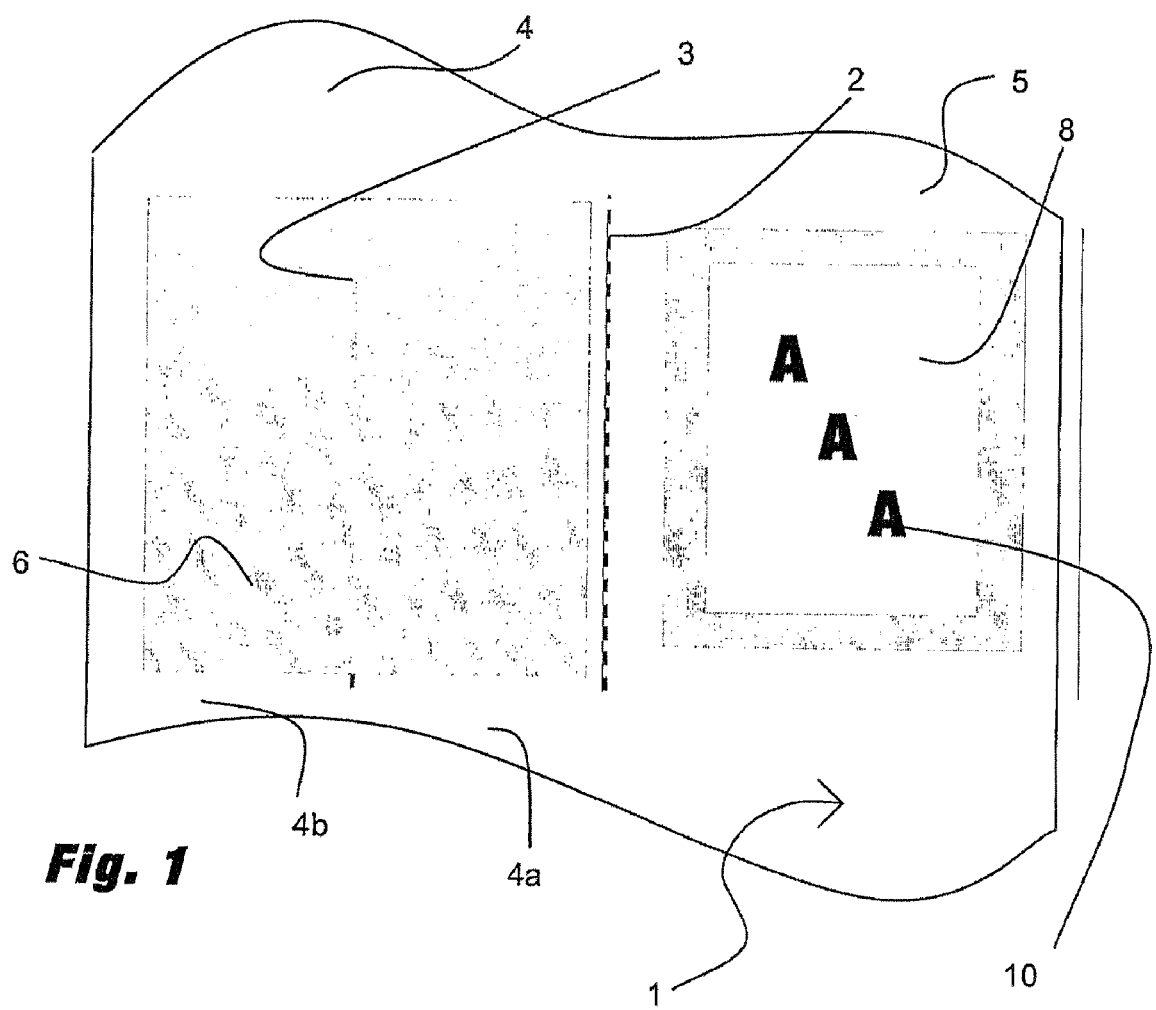
FIG. 1 is a top view of a system according to the invention.
Figure 2:
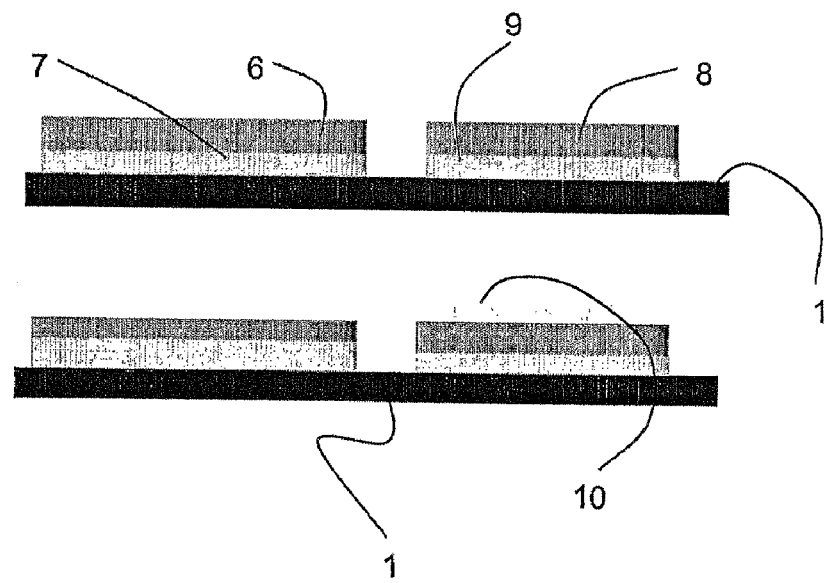
FIG. 2 is a cross-sectional view of such system wherein the thickness of the layers has been enlarged for a better understanding.
Figure 3:
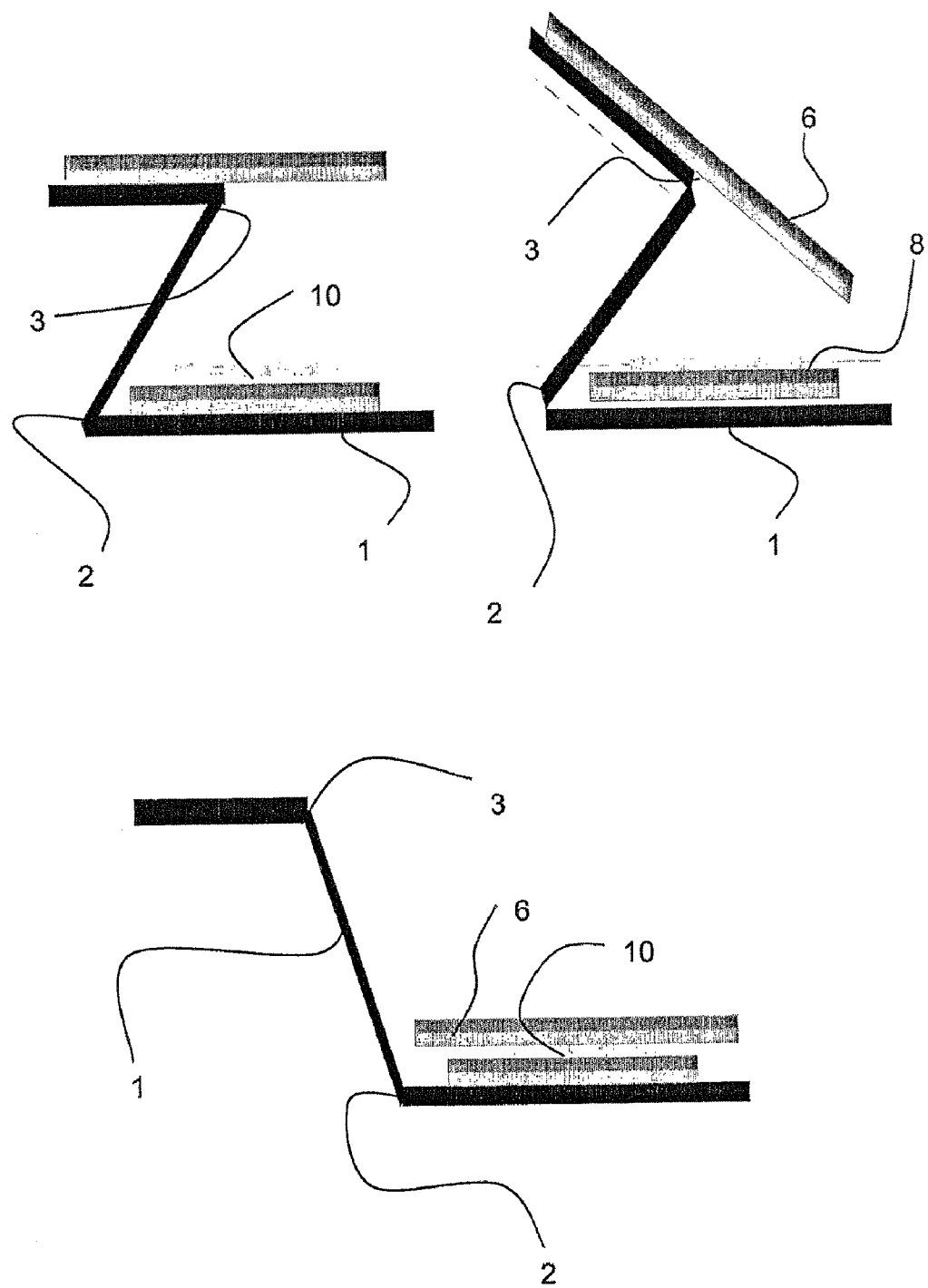
FIG. 3 illustrates the implementation of the method using such system.

In the Figures, a silicon-containing support sheet 1 can be seen, having the shape of a strip including two longitudinal folding lines 2 and 3. The line 2 separates the sheet 1 into two flaps 4 and 5, and the line 3 separates the flap 4 into two sub-flaps 4a and 4b.

A holographic component 6, which can be destroyed in case of a tentative tearing, is stuck on the flap 4 using an adhesive layer 7. The component 6 overlaps the folding line 3.

An at least partially transparent film 8, which can also be destroyed in case of a tentative tearing, is stuck on the flap 5 using an adhesive layer 9. The dimensions of the film 8 are smaller than that of the component 6. Prior to using the label, a personalising marking 10 is applied on the film 8.

To obtain the label proper, the holographic component 6 is partially unstuck from the support sheet 1 between the folding lines 2 and 3, then the unstuck part is applied onto the film 8 and the marking 10. The component 6 is then totally unstuck from the support sheet 1 and stuck on the film 8 using an adhesive layer 7, which results in sealing the marking 10.

The label thus obtained can thus be unstuck from the support sheet 1 and stuck on an object to be marked using the adhesive layer 9.

The invention claimed is:

1. A security marking system for producing a secure marking label, comprising;
    a support sheet containing silicon having two adjacent separate flaps defined by a first folding line, the support sheet having an initially unfolded configuration in which the first flap supports on a recto side of the support sheet a first holographic component, whereof a surface of the first holographic component contacting the support sheet is coated with an adhesive film,
    wherein the second flap supports on the recto side a second component formed by a film that is at least partially transparent, wherein a surface of the film contacting the support sheet is coated with the adhesive film and the opposite surface of the film bears indicia, the second component having an edge distant from the first folding line,
    wherein the first component and the second component are adjacent one another with respect to the first folding line, and
    wherein the first flap comprises a second folded line that is substantially parallel to the first folding line, the first holographic component overlapping the second folded line, and the support sheet capable of forming a zigzag folding configuration such that the first holographic component disengages from the first flap of the support sheet, extends over the far edge of the second component, and may be adhered over the second component to produce the secure marking label.

2. A security marking system according to claim 1, wherein said first holographic component is at least partially metallized.

3. A security marking system according to claim 1, wherein the second flap includes a second holographic component.

4. A security marking system according to claim 3, wherein said second holographic component is at least partially metallized.

5. A security marking system according to claim 1, wherein dimensions of the first holographic component are greater than dimensions of the second component.

6. A method for producing a security marking system comprising a secure marking label having a support sheet containing silicon having first and second flaps, the first flap supporting a first holographic component provided on a recto side of the support sheet, the second flap supporting a second component which includes a partially transparent film and bears indicia thereon, the first and second flaps of the support sheet being separate yet adjacent each other, and the support sheet having an initially unfolded configuration, the method comprising the following steps:
    forming a first folding line in the support sheet to define the first and second flaps;
    forming the first holographic component;
    coating a bottom surface of the first holographic component with an adhesive;
    placing, on the first flap, the first holographic component on the recto side of the support sheet, wherein the bottom surface of the first holographic component having the adhesive engages the support sheet;
    forming, from the partially transparent film, the second component;
    coating a bottom surface of the second component with the adhesive, wherein the second component has an edge distant from the first folding line;
    placing, on the second flap, the second component on the recto side of the support sheet, wherein the bottom surface of the second component having the adhesive engages the support sheet, wherein the first holographic component and the second component are obtained by processing the same film, and are adjacent each other with respect to the first folding line; and
    forming a second folded line in the first flap,
    wherein the first holographic component overlaps the second folded line, and the support sheet capable of forming a zigzag folding configuration such that the first holographic component disengages from the first flap of the support sheet, extends over the far edge of the second component, and may be adhered over the second component to produce the secure marking label.

7. A method according to claim 6, wherein the processing of at least part of the film which forms at least the first holographic component includes the steps of:
    stamping a thermosetting layer to form a holographic surface;
    metallizing at least a part of the holographic surface, and coating the metallized part of the holographic surface with the adhesive layer.

8. A method according to claim 7, further comprising a step of partially demetallizing the metallized part of the holographic surface.

9. A method for producing a security marking system comprising a secure marking label having a support sheet containing silicon having first and second flaps, the first flap supporting a first holographic component provided on a recto side of the support sheet, the second flap supporting a second component which bears indicia thereon, the method comprising the following steps:

forming a first folding line in the support sheet to define the first and second flaps;

forming the first holographic component;

coating a bottom surface of the first holographic component with an adhesive;

placing, on the first flap, the first holographic component on the recto side of the support sheet, wherein the bottom surface of the first holographic component having the adhesive engages the support sheet;

forming, from film, the second component;

coating a bottom surface of the second component with the adhesive;

placing, on the second flap, the second component on the recto side of the support sheet, wherein the bottom surface of the second component having the adhesive engages the support sheet, wherein the first holographic component and the second component are obtained by processing the same film;

forming a second folding line in the first flap that is substantially parallel to the first folding line, the second folding line defining first and second sub-flaps;

folding the support sheet in a zigzag configuration;

partially removing from the support sheet at least a portion of the first holographic component that is located in the first sub-flap which is defined between the first and second folding lines;

adhering, on the second component, the removed portion of the first holographic component;

removing a remainder of the first holographic component from the support sheet that is located in the second sub-flap; and adhering the remainder of the first holographic component onto the second component.

\* \* \* \* \*